United States Patent
Lin et al.

(10) Patent No.: US 7,438,753 B2
(45) Date of Patent: Oct. 21, 2008

(54) DIAZO DYESTUFF COMPOUNDS AND THEIR USE

(75) Inventors: Jen-Fang Lin, Taoyuan County (TW); Tzu-Kwei Sun, Taoyuan County (TW); Hsiao-San Chen, Taoyuan County (TW); Wen-Chin Lin, Taoyuan County (TW)

(73) Assignee: Everlight USA, Inc., Pineville, NC (US)

( * ) Notice: Subject to any disclaimer, the term of this patent is extended or adjusted under 35 U.S.C. 154(b) by 359 days.

(21) Appl. No.: 11/452,911

(22) Filed: Jun. 15, 2006

(65) Prior Publication Data

US 2007/0050926 A1    Mar. 8, 2007

(30) Foreign Application Priority Data

Sep. 5, 2005    (CN) .................. 2005 1 0099486

(51) Int. Cl.
  $C09D\ 11/00$   (2006.01)
  $C09B\ 31/08$   (2006.01)
  $C09B\ 67/36$   (2006.01)
  $C09B\ 62/45$   (2006.01)

(52) U.S. Cl. ............. 106/31.52; 106/31.49; 106/31.58; 106/31.59; 8/639; 8/673; 8/681; 8/549; 534/827

(58) Field of Classification Search ............. 106/31.52, 106/31.49, 31.58, 31.59; 8/639, 673, 681, 8/549; 534/827
See application file for complete search history.

(56) References Cited

U.S. PATENT DOCUMENTS

| | | | | |
|---|---|---|---|---|
| 4,257,770 A | * | 3/1981 | Nishimura et al. ............. 8/549 |
| 4,492,654 A | * | 1/1985 | Hoyer et al. ................. 534/827 |
| 4,694,302 A | | 9/1987 | Hackleman et al. .......... 346/1.1 |
| 5,062,892 A | | 11/1991 | Halko .......................... 106/22 |
| 5,445,654 A | * | 8/1995 | Hussong et al. ................ 8/549 |
| 5,690,698 A | * | 11/1997 | Von Der Eltz et al. .......... 8/549 |
| 6,171,349 B1 | * | 1/2001 | Lai et al. ....................... 8/549 |
| 6,500,246 B2 | * | 12/2002 | Huang et al. ............. 106/31.58 |
| 6,585,782 B2 | * | 7/2003 | Huang et al. ................... 8/549 |
| 6,946,006 B2 | * | 9/2005 | Eichhorn et al. ............... 8/549 |
| 7,282,070 B2 | * | 10/2007 | Chen et al. ..................... 8/673 |
| 7,288,142 B2 | * | 10/2007 | Lin et al. ................. 106/31.52 |
| 7,387,647 B2 | * | 6/2008 | Huang et al. ................... 8/681 |
| 7,387,667 B1 | * | 6/2008 | Lin et al. ................. 106/31.52 |
| 2004/0139567 A1 | * | 7/2004 | Eichhorn ....................... 8/639 |

* cited by examiner

Primary Examiner—Helene Klemanski
(74) Attorney, Agent, or Firm—Bacon & Thomas, PLLC

(57) ABSTRACT

The present invention relates to a diazo dyestuff compound of the following formula (I)

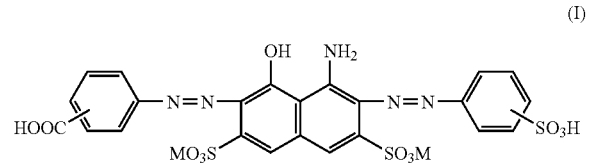

(I)

wherein, M is H, Na, or Li. The formula (I) compound is particularly suitable for using as a component in a black dye composition for ink-jet printing ink, and inkjet printing inks with good light-fastness are obtained.

12 Claims, No Drawings

DIAZO DYESTUFF COMPOUNDS AND THEIR USE

BACKGROUND OF THE INVENTION

1. Field of the Invention

The present invention relates to a diazo dyestuff compound, and particularly, a diazo dyestuff compound suitable for use in a black dye composition for ink-jet printing ink, where it can be mix with other dyestuffs and varying components to prepare a black ink-jet printing ink having good light-fastness.

2. Description of the Related Prior Art

In the field of ink-jet printing, the application at present is short of black ink dyestuff components having good light fastness. The U.S. Pat. No. 4,694,302 and U.S. Pat. No. 5,062,892 disclosed black ink dyestuff compositions that are commonly used in the past. One of such is the dyestuff edible black 2, yet poor properties such as light fastness is exposed thus not satisfying the afore printing need; one another is C.I. Direct Black 168 where the dye has the advantage of good light fastness, however it exhibits low solubility thus limited for the use as ink-jet printing dyestuff components. From that in the dyestuff composition for ink-jet printing, methods for providing a dyestuff composition capable of mixing with other dyestuffs or components for the making of black ink composition characterized with good light fastness is an area that requires continuous efforts.

SUMMARY OF THE INVENTION

The present invention provides a novel diazo dyestuff compound suitable for use in a black dye composition for ink-jet printing ink. The diazo dyestuff compound of the present invention can be mix with other dyestuffs to prepare a black dyestuff composition, also it may be further prepared to obtain black ink composition having good light-fastness.

The diazo dyestuff compound of the present invention having the structure of the following formula (I):

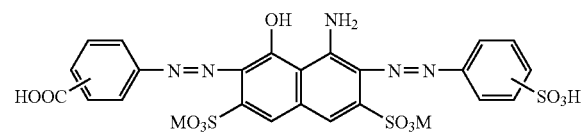

(I)

Wherein M is H, Na or Li. Preferably, the compound of formula (I) of the present invention is the following formula (I-1).

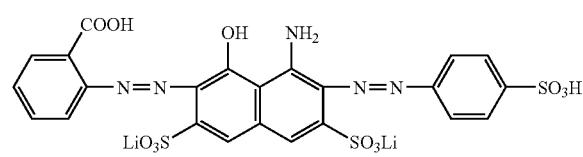

(I-1)

The diazo dyestuff compound of the present invention may mix with at least one non-black dyestuff selected from the group consisting of yellow dyestuffs, red dyestuffs, and orange dyestuffs to prepare a black dye composition.

The black dye composition of the present invention comprising (A) a diazo dyestuff compound of the following formula (I),

(I)

wherein, M is H, Na or Li; said diazo dyestuff compound of formula (I) is present in an amount ranging from 50% to 97% by weight; and (B) at least one non-black dyestuff selected from the group consisting of yellow dyestuffs, red dyestuffs, and orange dyestuffs, said non-black dyestuff is present in an amount ranging from 50% to 3% by weight.

The yellow dyestuffs of the component (B) of the present invention are preferably selected from the dyestuffs consisting of: C.I. Direct Yellow 86, C.I. Direct Yellow 98, C.I. Direct Yellow 132, C.I. Direct Yellow 142, C.I. Direct Yellow 173, C.I. Acid Yellow 23, C.I. Reactive Yellow 3, hydrolyzed structure of C.I. Reactive Yellow 3, Yellow 85, hydrolyzed structure of Yellow 85, Yellow 95, hydrolyzed structure of Yellow 95, and a dyestuff compound of the following formula (II):

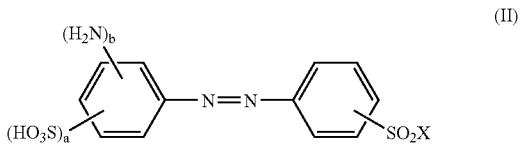

(II)

wherein a is 1 or 2;

b is 1 or 2;

X is OH, $CH_2CH_2OH$ or $CH_2CH_2OSO_3H$.

Preferably the dyestuff compound of formula (II) is the following dyestuff compound of formula (II-1).

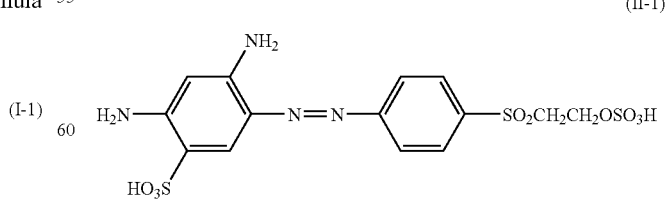

(II-1)

The red dyestuffs of the component (B) of the present invention are preferably selected from the dyestuffs consisting of: C.I. Acid Red 52, C.I. Acid Red 249, C.I. Acid Red 289, C.I. Direct Violet 106, C.I. Direct Violet 107, C.I. Direct Red 227, C.I. Reactive Red 24.1, hydrolyzed structure of C.I. Reactive Red 24.1, Red 31, hydrolyzed structure of Red 31, Red 180, hydrolyzed structure of Red 180, Red 23, hydrolyzed structure of Red 23, Red 3.1, hydrolyzed structure of Red 3.1 and hydrolyzed structure of C.I. Reactive Red 218.

The orange dyestuffs of the component (B) of the present invention are preferably selected from the dyestuffs consisting of: C.I. Reactive Orange 13 and a dyestuff compound of the following formula (III):

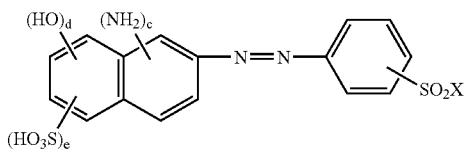

wherein c is 1 or 2;

d is 1 or 2;

e is 1, 2 or 3;

X is OH, $CH_2CH_2OH$ or $CH_2CH_2OSO_3H$.

Preferably the dyestuff compound of formula (III) is the following dyestuff compound of formula (III-1).

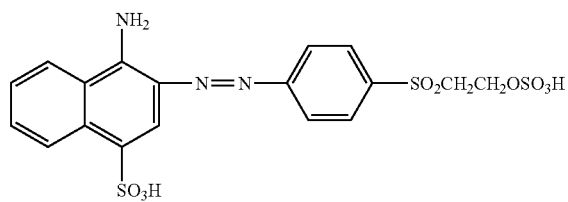

The diazo dyestuff compound or the black dye composition of the present invention may be further synthesized to form black ink composition.

The black ink composition of the present invention comprises:

(A') a diazo dyestuff compound of claim 1 or a black dyestuff composition of claim 3 presenting in an amount ranging from 1% to 10% by weight;

(B') an organic solvent presenting in an amount ranging from 20% to 30% by weight; and (C') deionized water presenting in an amount ranging from 55% to 70% by weight.

Preferably the organic solvent of the above black ink composition is selected from the group consisting of: ethylene glycol, diethylene glycol, triethylene glycol, propylene glycol, butylene glycol, ethylene glycol monoethyl ether, ethylene glycol monobutyl ether, diethylene glycol monoethyl ether, 2-pyrrolidone, N-methyl-2-pyrrolidone, 1,3-dimethyl-2-imidazolidinone, and triethanolamine.

The black ink composition of the present invention may further comprising a component (D'): a surfactant of the following compound:

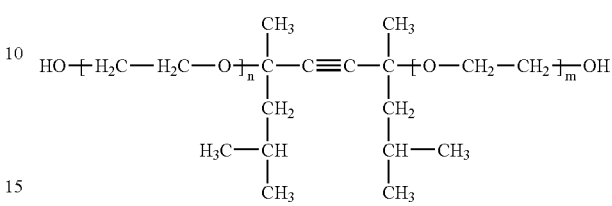

wherein the summation of n and m is an integer between 0 to 50; the surfactant is present in an amount ranging from 0.001% to 5% by weight.

DETAILED DESCRIPTION OF THE PREFERRED EMBODIMENT

The diazo dyestuff compound of formula (I) of the present invention can be prepared by the following method. First, the diazonium salt of amino benzene sulfonic acid is coupled with 1-Amino-8-naphthol-3,6-disulfonic acid under an acidic condition to obtain a monoazo compound. Then, the monoazo compound is reacted with the diazonium salt of amino benzoic acid under a basic condition to yield a compound of formula (I).

The black dyestuff composition of the present invention is prepared by mixing the diazo dyestuff compound of formula (I) with at least one non-black dyestuff selected from the group consisting of yellow dyestuffs, red dyestuffs, and orange dyestuffs. The components and ratios relating to the black dyestuff composition of the present invention are described in the foregoing description, where the method of mixing and preparing are familiar to those skilled in the art and will not be further explained herein.

In the preparation of the black ink composition of the present invention, the black ink composition of the present invention comprising (A') the aforementioned diazo dyestuff compound of formula (I) or the aforementioned black dyestuff composition presenting in an amount ranging from 1% to 10% by weight; (B') organic solvent presenting in an amount ranging from 20% to 30% by weight; and (C') deionized water presenting in an amount ranging from 55% to 70% by weight. The components and ratios relating to the black ink composition of the present invention are described in the foregoing description, where the method of mixing and preparing are familiar to those familiar with the skill and will not be further explained herein.

The black ink composition of the present invention may further comprise a component (D') surfactant. The surfactant is selected from the group consisting of: acetylene glycol derivative-Surfynol 465, Surfynol 485, Surfynol 420 and Surfynol 104 (product of Air Products & Chemicals, Inc.), where the general chemical structure is the following formula

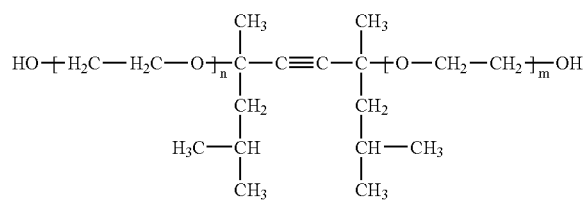

wherein the sum of n and m is an integer between 0 to 50.

The diazo dyestuff compound of formula (I), black dyestuff composition, and black ink composition provided by the present invention are exemplified in the following examples, and for convenience in the further statement, many examples have been used to illustrate the present invention. The examples sited below should not be taken as a limit to the scope of the invention. In these examples, the compounds are expressed in the form of free acid. However, in practice, they will exist as metallic salts, and more likely alkaline metallic salts, particularly sodium salts. In the following examples, quantities are given as parts by weight (%) if there is no indication, and temperature is measured in the unit of degree Celsius °C.

EXAMPLE 1

The Preparation of the Diazo Dyestuff Compound of Formula (I-1)

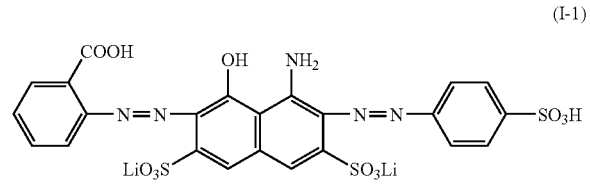

Dissolve 34 g of p-amino benzene sulfonic acid in water, then add sodium nitrite and hydrochloric acid solution in a mole ratio of 1:1.05 at 10° C. to yield an diazotized solution. The diazotized solution then undergoes acidic binding with 1-Amino-8-naphthol-3,6-disulfonic acid or its salt at a coupling pH of 1.0, yielding a monoazo compound. Likewise, 25 g of anthranilic acid or its salt is subjected to the diazotization reaction by the foregoing method, then coupled with the monoazo compound at a pH of 9.0. Finally, it is extracted by salinating with 800 g of NaCl, then filtered to obtain the cake. The cake is then baked dry to obtain the diazo dyestuff compound with the structure given by formula (I-1), abs./λmax=768/607 nm, 20 ppm.

EXAMPLE 2

The Preparation of the Black Dyestuff Composition

Take 58.1 g of the diazo dyestuff compound of formula (I-1), 8.3 g of the dyestuff compound of formula (II-1), 30.9 g of the dyestuff compound of formula (III-1), and 2.6 g of the following hydrolyzed structure of C.I. Reactive Red 218 compound into a mixer. Then, they are mixed completely to obtain a black dyestuff composition with an approximate weight of 100 g.

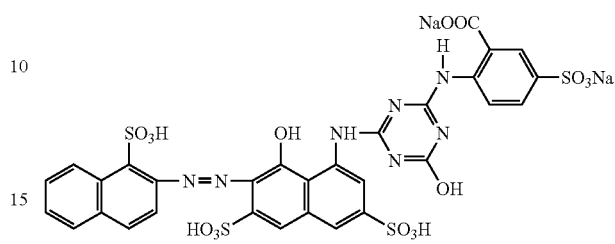

EXAMPLE 3

The Preparation of the Black Dyestuff Composition

Take 53.4 g of the diazo dyestuff compound of formula (I-1), 24.6 g of the dyestuff compound of formula (II-1), and 22 g of the dyestuff compound of formula (III-1) into a mixer. Then, they are mixed completely to obtain a black dyestuff composition with an approximate weight of 100 g.

EXAMPLE 4

The Preparation of the Black Dyestuff Composition

Take 55.8 g of the diazo dyestuff compound of formula (I-1), 16.5 g of the dyestuff compound of formula (II-1), 26.5 g of the dyestuff compound of formula (III-1), and 1.3 g hydrolyzed structure of C.I. Reactive Red 218 compound into a mixer. Then, they are mixed completely to obtain a black dyestuff composition with an approximate weight of 100 g.

EXAMPLE 5

The Preparation of the Black Ink Composition of the Present Invention

Adjusting the pH value of the aforementioned preparation example diazo dyestuff compound of formula (I-1) to 10~12 with the use of 45% sodium hydroxide solution. After, elevating the temperature to 80° C. and maintaining at the temperature for 90 minutes for reaction to carry out. Subsequently 32% hydrochloric acid solution is applied to adjust the pH value to 7~7.5, then reverse osmosis desalination is carried out, after it is spray dried and mix with the components of the following table 1, and then the solution is filtered to obtain the ink composition.

COMPARATIVE EXAMPLE 1

The Preparation of the Known Black Ink Composition

Preparing 3 g of the C.I. Reactive Black 5 dyestuff compound and to that 68.7 g of deionized water are added, where then sodium hydroxide solution is further applied for dissolving. Follow up in the following order 10 g of diethylene glycol, 10 g of diethylene glycol mono-butyl ether, 7 g of glycerine, 1.3 g of surfactant and biocide are added and mixed together completely, next 32% hydrochloric acid solution is applied to adjust the pH value to 7~7.5, then reverse osmosis desalination is carried out, after solution is filtered to obtain the black ink composition.

COMPARATIVE EXAMPLE 2

Preparing 16 g of the Bayscrip Black SP (Bayscrip Black SP is a manufactured product of Bayer Corp) where then 55.7 g of deionized water are added, on top of that sodium hydroxide solution is furthered applied for dissolving. Follow up in the following order 10 g of diethylene glycol, 10 g of diethylene glycol mono-butyl ether, 7 g of glycerine, 1.3 g of surfactant and biocide are added and mixed completely, next 32% hydrochloric acid solution is applied to adjust the pH value to 7~7.5, then reverse osmosis desalination is carried out, after solution is filtered to obtain the black ink composition.

TABLE 1

Recipe of the ink composition

|  | Sample group A | Sample group B | Sample group C | Comparative group D | Comparative group E |
|---|---|---|---|---|---|
| Dyestuff composition | 3% | 4.3% | 4.68% | 3% | 16% |
| DEG | 10% | 10% | 10% | 10% | 10% |
| DEGMBE | 10% | 10% | 10% | 10% | 10% |
| Glycerine | 7% | 7% | 7% | 7% | 7% |
| S-465 | 1% | 1% | 1% | 1% | 1% |
| PROXEL-XL2 | 0.3% | 0.3% | 0.3% | 0.3% | 0.3% |
| DI-water | 68.7% | 67.4% | 67.0% | 68.7% | 55.7% |

|  | Dyestuff composition | | | | |
|---|---|---|---|---|---|
|  | A | B | C | D | E |
| DYE 1 |  |  |  | 3% |  |
| DYE 2 | 3% | 2.5% | 2.5% |  |  |
| DYE 3 |  | 0.36% | 1.15% |  |  |
| DYE 4 |  | 1.33% | 1.03% |  |  |
| DYE 5 |  | 0.11% |  |  |  |
| DYE 6 |  |  |  |  | 16% |

The above DYE 1 represents the C.I. Reactive Black 5;

DYE 2 represents the diazo dyestuff compound of formula (I-1) of the present invention;

DYE 3 represents the dyestuff compound of formula (II-1) of the present invention;

DYE 4 represents the dyestuff compound of formula (III-1) of the present invention;

DYE 5 represents the following hydrolyzed structure of C.I. Reactive Red 218 compound;

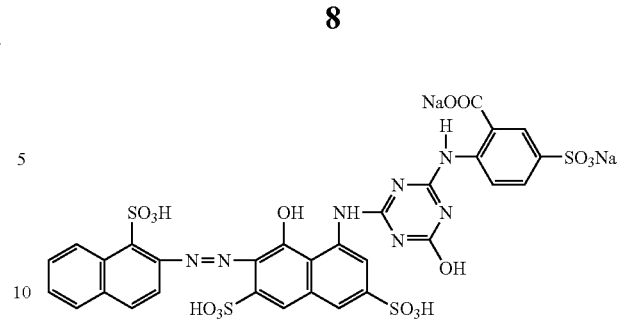

DYE 6 represents the Bayscrip Black SP, a product of Bayer Corp.

DEG represents the diethylene glycol

DEGME represents the diethylene glycol mono-butyl ether

S-465 represents the aforementioned surfactant, a product marketed under Air Products & Chemicals, Inc.

PROXEL-XL2 represents the biocide, a product marketed under Bayer Corp.

DI-water represents the deionized water

TEST EXAMPLE

Printing with the printing test condition shown below; after examining the light fastness and the water fastness by comparing with the black ink composition frequently used in the market, where the comparison is done with the use of Bayscrip Black SP a product of Bayer Corp., the result of the test is shown in the following table 2.

Printer: EPSONSTYLUS PHOTO 830U PRINTER.

Printing paper: PLAIN PAPER.

Light fastness test:

Exposing the printed-paper under xenon arc lamp, the condition is set so that a total energy of 85KJ is applied. Follow up the color difference of before and after xenon arc lamp exposure is examined with the use of DATACOLOR color spectrometer, where larger the magnitude of DE larger the color difference is between before and after exposure, which means poor light fastness.

Water Fastness Test:

Adding 200 g of pure water to a beaker, and to the beaker shredded printed papers of area 5 cm*5 cm are immersed straight up in the pure water for a minute. Next, the square papers are taken out and allowing the excess water to drip for a minute by sitting them straight up, and after the papers are baked dry under a temperature of 60° C. Furthermore the color difference of before and after washing is examined with the use of DATACOLOR color spectrometer, where larger the magnitude of DE larger the color difference is between before and after washing, which means poor water fastness.

TABLE 2

Light fastness and water fastness test result of printed-paper

| Ink recipe | Change of DE under water fastness | Change of DE under light fastness |
|---|---|---|
| Sample group A | 16.3 | 2.99 |
| Sample group B | — | 5.18 |

TABLE 2-continued

Light fastness and water fastness test result of printed-paper

| Ink recipe | Change of DE under water fastness | Change of DE under light fastness |
| --- | --- | --- |
| Sample group C | — | 4.51 |
| Comparative group D | 19.0 | 3.42 |
| Comparative group E | — | 7.44 |

Note 1: Change of DE under water fastness—the smaller the change in DE the smaller the color difference is between before and after washing, meaning good water fastness.

Note 2: Change of DE under light fastness—the smaller the change in DE the smaller the color difference is between before and after exposure, meaning good light fastness.

From the foregoing table, the ink composition A of the present invention is better than the comparative group D in both light fastness and water fastness, on top of that the black ink composition B, C of the present invention is better than the comparative group E in light fastness.

From the foregoing description, regardless of the objects, the techniques, the effects or the skill aspects and developments, the present invention is distinctive with respect to known skills. Although the present invention has been explained in relation to its preferred embodiment, it is to be understood that many other possible modifications are variations can be made without departing from the scope of the invention as hereinafter claimed.

What is claimed is:

1. A diazo dyestuff compound of the following formula (I):

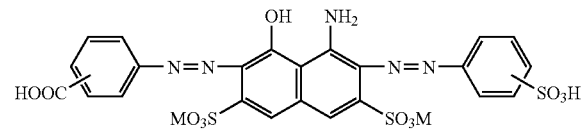

(I)

wherein M is H, Na or Li.

2. The diazo dyestuff compound of claim 1, wherein said diazo dyestuff compound of formula (I) is the following formula (I-1):

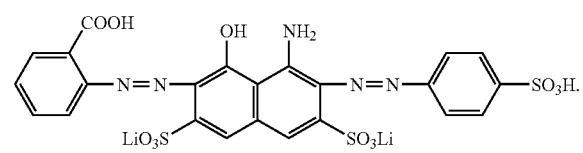

(I-1)

3. A black dyestuff composition comprising:
   (A) a diazo dyestuff compound of the following formula (I),

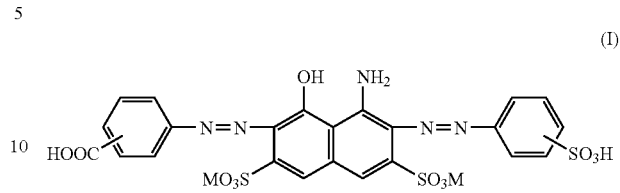

(I)

wherein, M is H, Na or Li; said diazo dyestuff compound of formula (I) is present in an amount ranging from 50% to 97% by weight; and
   (B) at least one non-black dyestuff selected from the group consisting of yellow dyestuffs, red dyestuffs, and orange dyestuffs, said non-black dyestuff is present in an amount ranging from 50% to 3% by weight.

4. The black dyestuff composition of claim 3, wherein said yellow dyestuffs of the component (B) are selected from the dyestuffs consisting of: C.I. Direct Yellow 86, C.I. Direct Yellow 98, C.I. Direct Yellow 132, C.I. Direct Yellow 142, C.I. Direct Yellow 173, C.I. Acid Yellow 23, C.I. Reactive Yellow 3, hydrolyzed structure of C.I. Reactive Yellow 3, Yellow 85, hydrolyzed structure of Yellow 85, Yellow 95, hydrolyzed structure of Yellow 95, and a dyestuff compound of the following formula (II):

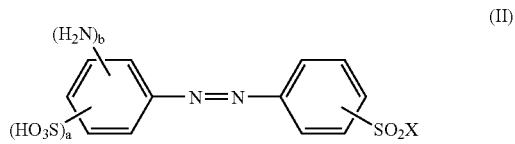

(II)

wherein
a is 1 or 2;
b is 1 or 2; and
X is OH, $CH_2CH_2OH$ or $CH_2CH_2OSO_3H$.

5. The black dyestuff composition of claim 4, wherein said dyestuff compound of formula (II) is the following formula (II-1):

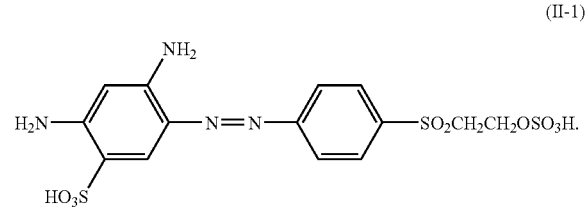

(II-1)

6. The black dyestuff composition of claim 3, wherein said red dyestuffs of the component (B) are selected from the dyestuffs consisting of: C.I. Acid Red 52, C.I. Acid Red 249, C.I. Acid Red 289, C.I. Direct Violet 106, C.I. Direct Violet 107, C.I. Direct Red 227, C.I. Reactive Red 24.1, hydrolyzed structure of C.I. Reactive Red 24.1, Red 31, hydrolyzed structure of Red 31, Red 180, hydrolyzed structure of Red 180, Red 23, hydrolyzed structure of Red 23, Red 3.1, hydrolyzed structure of Red 3.1 and hydrolyzed structure of C.I. Reactive Red 218.

7. The black dyestuff composition of claim 3, wherein said orange dyestuffs of the component (B) are selected from the dyestuffs consisting of: C.I. Reactive Orange 13 and a dyestuff compound of the following formula (III):

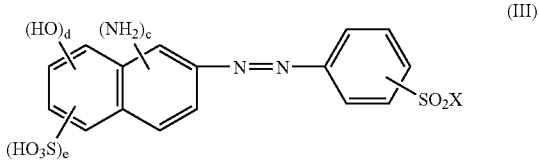

wherein
c is 1 or 2;
d is 1 or 2;
e is 1, 2 or 3; and
X is OH, $CH_2CH_2OH$ or $CH_2CH_2OSO_3H$.

8. The black dyestuff composition of claim 7, wherein said dyestuff compound of formula (III) is the following formula (III-1):

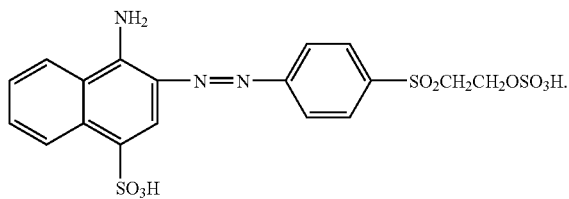

9. A black ink composition comprising:
(A') a diazo dyestuff compound of claim 1 presenting in an amount ranging from 1% to 10% by weight;
(B') an organic solvent presenting in an amount ranging from 20% to 30% by weight; and
(C') deionized water presenting in an amount ranging from 55% to 70% by weight.

10. The black ink composition of claim 9, wherein said organic solvent is selected from the group consisting of: ethylene glycol, diethylene glycol, triethylene glycol, propylene glycol, butylene glycol, ethylene glycol monoethyl ether, ethylene glycol monobutyl ether, diethylene glycol monoethyl ether, 2-pyrrolidone, N-methyl-2-pyrrolidone, 1,3-dimethyl-2-imidazolidinone, and triethanolamine.

11. The black ink composition of claim 9, wherein said black ink composition further comprising a component (D'): a surfactant of the following compound:

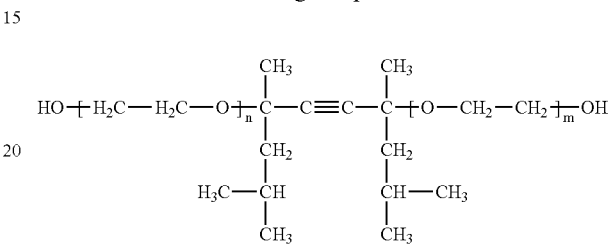

wherein the summation of n and m is an integer between 0 to 50; said surfactant is present in an amount ranging from 0.001% to 5% by weight.

12. A black ink composition comprising:
(A') a black dyestuff composition of claim 3 presenting in an amount ranging from 1% to 10% by weight;
(B') an organic solvent presenting in an amount ranging from 20% to 30% by weight; and
(C') deionized water presenting in an amount ranging from 55% to 70% by weight.

* * * * *